(12) United States Patent
Gueugnaut et al.

(10) Patent No.: US 7,200,456 B2
(45) Date of Patent: Apr. 3, 2007

(54) IDENTIFICATION PROCESS THAT MAKES IT POSSIBLE TO CONFER TRACEABILITY TO MANUFACTURED PRODUCTS

(75) Inventors: Dominique Gueugnaut, Paris (FR); Alain Darut, Chatou (FR); Francis Dattolo, Juvisy sur Orge (FR)

(73) Assignee: Gaz de France-(GDF) Service National, Paris (FR)

( * ) Notice: Subject to any disclaimer, the term of this patent is extended or adjusted under 35 U.S.C. 154(b) by 746 days.

(21) Appl. No.: 10/411,382

(22) Filed: Apr. 11, 2003

(65) Prior Publication Data

US 2004/0083020 A1    Apr. 29, 2004

(30) Foreign Application Priority Data

Apr. 18, 2002   (FR)   .................................. 02 04871

(51) Int. Cl.
  *G06F 19/00*   (2006.01)
  *G06F 7/00*    (2006.01)
(52) U.S. Cl. ........................ 700/115; 700/95; 700/225; 340/572.1; 705/28
(58) Field of Classification Search .................. 700/95, 700/108, 112, 115, 116–117, 213–215, 225–227; 705/7, 8, 28, 29; 340/825.54, 825.35, 572.1
See application file for complete search history.

(56) References Cited

U.S. PATENT DOCUMENTS

| | | | |
|---|---|---|---|
| 6,246,778 B1 | 6/2001 | Moore | |
| 6,259,056 B1 | 7/2001 | Cowden | |
| 6,260,049 B1* | 7/2001 | Fitzgerald et al. | ........ 707/104.1 |
| 6,522,945 B2* | 2/2003 | Sleep et al. | .................. 700/225 |
| 2003/0176942 A1* | 9/2003 | Sleep et al. | .................. 700/213 |
| 2004/0230503 A1* | 11/2004 | Lucas | ........................... 705/28 |
| 2005/0075900 A1* | 4/2005 | Arguimbau, III | .............. 705/1 |

FOREIGN PATENT DOCUMENTS

| | | |
|---|---|---|
| JP | 8-179807 | 7/1996 |
| JP | 10-245021 | 9/1998 |
| JP | 2000-90180 | 3/2000 |
| WO | WO 00/45324 | 8/2000 |

* cited by examiner

*Primary Examiner*—Albert W. Paladini
*Assistant Examiner*—Douglas S. Lee
(74) *Attorney, Agent, or Firm*—Leydig, Voit & Mayer, Ltd.

(57) ABSTRACT

The invention concerns an identification process that makes it possible to confer traceability to manufactured products (PROD), from data of origin (C, D) initially brought together at a source point (P_SOURCE) and including a control identification number (C) and manufacturing data (D) common to these products (PROD).

The process of the invention provides for the formation of two parallel information flows, ($\Phi_1$ and $\Phi_2$), each of which ensures a propagation of the data of origin (C, D) in time and space from the source point (P_SOURCE), and includes three tests (COMPAR_1, COMPAR_2, COMPAR_3) that makes it possible to verify the internal consistency and integrity of these data of origin in the form in which they are propagated.

16 Claims, 1 Drawing Sheet

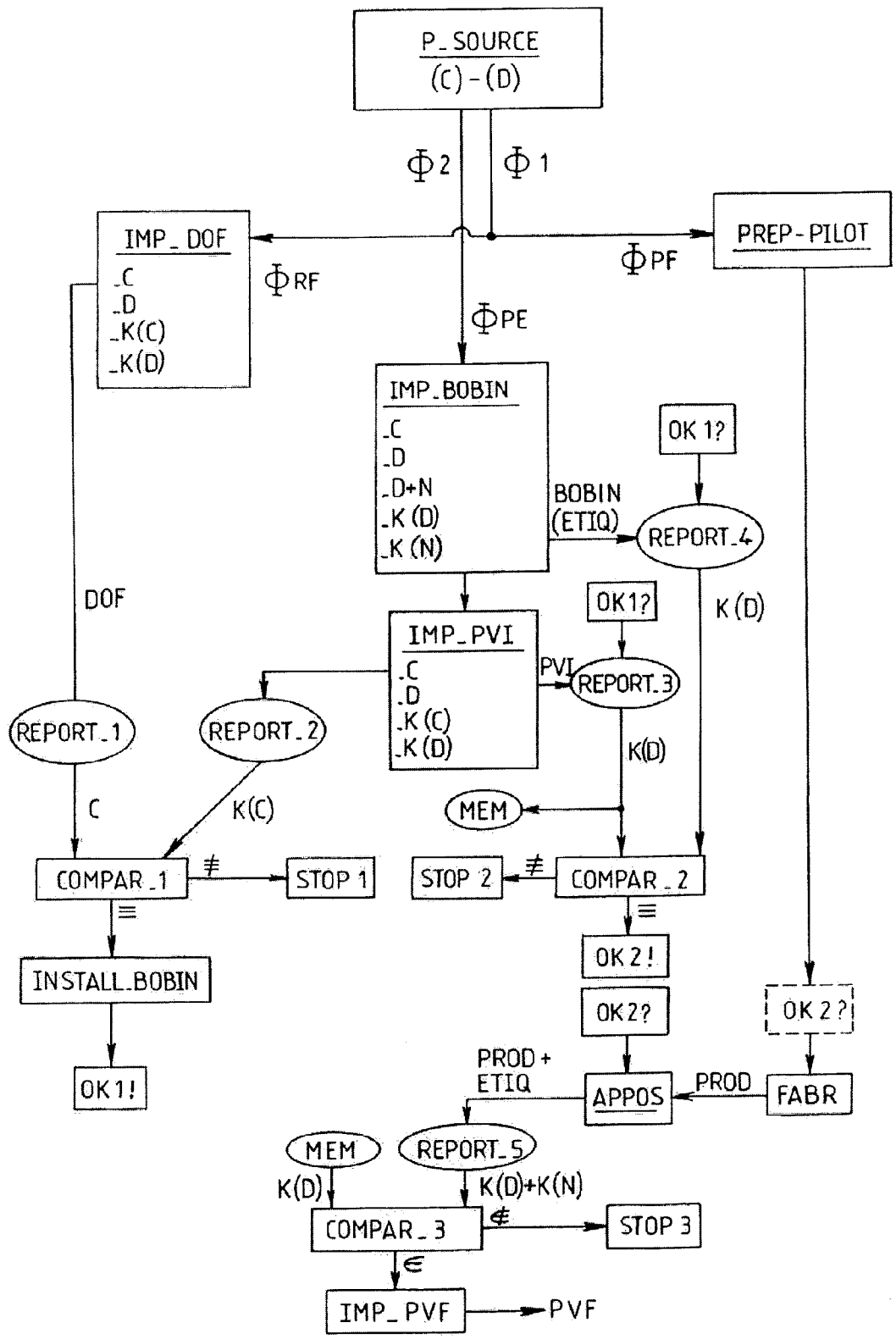

IDENTIFICATION PROCESS THAT MAKES IT POSSIBLE TO CONFER TRACEABILITY TO MANUFACTURED PRODUCTS

FIELD OF THE INVENTION

The present invention concerns, in a general way, techniques for keeping track of products intended to be the object of a time-limited operation as they relate to the guarantee of functionality and/or safety, where these techniques are designed in order to make it possible in particular to optimize the inspection of the change of these products in time, to correlate this change with the characteristics of constitution or the manufacture of these products, to optimize the replacement of these products, and to anticipate their failure before the appearance of problematic defects.

More precisely, the invention concerns, according to one of its primary aspects, an identification process that makes it possible to confer traceability to products manufactured on a production line, in the course of a manufacturing campaign, and from data of origin initially brought together at a source point and including a control identification number and manufacturing data common to the products manufactured during this campaign.

Techniques of traceability are known and used in different industrial sectors, an example of which is given in Patent Application WO9851458.

These techniques generally have in common the fact that they require correct and indissoluble attribution of information which specifically relates to each product to be identified and which possibly describes it in a unique manner.

BRIEF SUMMARY OF THE INVENTION

The aim of the present invention is precisely to propose a process for identification of products that meets this need.

For this purpose, the process of the invention, in other respects conforming to the generic definition given for it in the preamble above, is essentially characterized by the fact that it includes the installation of two parallel flows of information, each of which ensures a propagation of the data of origin in time and space from the source point, the first of these flows being subdivided into a manufacturing control flow, intended for controlling the manufacture of products according to the manufacturing data, and into a manufacturing reference flow, where the second flow forms a labeling control flow, intended for controlling an operation for marking the manufactured products by means of an operation of appending labels to these products, by the fact that the propagation of the data of origin in the manufacturing reference flow is at least ensured by the printing of a manufacturing order document, by the fact that the propagation of the data of origin in the labeling control flow is at least ensured by the printing of a reel of labels and by the subsequent printing of a printing report for the reel, and by the fact that this process also includes at least a first test verifying the consistency between the control identification number as printed on the manufacturing order document and the control identification number as printed on the printing report for the reel, a second test verifying the consistency between the manufacturing data propagated by the labeling control flow, as printed on the label reel and as printed on the printing report, and a third test verifying the consistency between the manufacturing data as printed on the printing report and as printed on the labels appended to the manufactured products.

Preferably, the control identification number is printed on the printing report at least in the form of a control identification number optical code readable by an optical reader and linked to the control identification number by a predetermined coding rule.

The first test is typically implemented by transferring into the memory of a first computer, as a first element of comparison, the control identification number read on the manufacturing order document, by transferring into the memory of this first computer, as a second element of comparison, the control identification number read by a first optical reader connected to the first computer in the form of the control identification number optical code printed on the printing report, and by giving the first computer the task of verifying the correspondence between the first and second elements of comparison.

It is possible to make provisions for the reading of the control identification number on the manufacturing order document by a human operator who reads it in uncoded form and enters it several times successively on a keyboard connected to the first computer, and, with respect to the implementation of the first test, for the verification by the first computer of the identicality of the control identification numbers entered by the operator and the second element of comparison, where said second element of comparison is obtained by decoding, by means of the predetermined coding rule, of the control identification number optical code read by the first optical reader.

If the first test is completed successfully, the label reel can be installed on the production line, and an authorization can be given to proceed with the second test.

The manufacturing data is advantageously printed, on the printing report and on the label reel, at least in the form of respective manufacturing data optical codes which can be read by an optical reader and which are linked to the respective control identification numbers by the predetermined coding rule.

The second test can then be implemented by transferring into the memory of a second computer, as a third element of comparison, the manufacturing data read by a second optical reader connected to the second computer in the form of the manufacturing data optical code printed on the printing report, by transferring into the memory of the second computer, as a fourth element of comparison, the manufacturing data read by the second optical reader connected to the second computer in the form of the manufacturing data optical code printed on the label reel, and by giving the second computer the task of verifying the correspondence between the third and fourth elements of comparison.

If the second test is completed successfully, an authorization can be given to label the manufactured products one by one, and to proceed with the third test.

More precisely, an authorization can be given to manufacture the products, to label them one by one as they are output from the production line and in the process of their manufacture, and simultaneously to proceed with the third test.

The process of the invention advantageously includes an additional verification operation consisting, after the printing of each label of the label reel, of re-reading this label automatically in order to verify at least that it has been printed completely.

Each label of the reel, in addition to the manufacturing data optical code, can carry an optical code linked by the predetermined coding rule to a serial number specifically assigned to the product which is intended to receive this label.

If this is the case, the third test is, for example, implemented by transferring into the memory of a third computer, as a fifth element of comparison, the manufacturing data and the serial number read by a third optical reader connected to the third computer in the form of the manufacturing data and serial number optical codes printed on each label, by transferring into the memory of the third computer, as a sixth element of comparison, the manufacturing data read in the form of the manufacturing data optical code printed on the printing report, and by giving the third computer the task of verifying that the sixth element of comparison is contained in the fifth element of comparison.

In fact, the second and third computers can consist of the same unit in the form of a shop floor terminal, where it is possible for the sixth element of comparison to consist of the third element of comparison stored in memory in said shop floor terminal on the occasion of the second test.

The process of the invention advantageously includes the printing of a final manufacturing and labeling report, which is produced if the third test is completed successfully.

The process as defined above is applicable particularly to the traceability of products made of polyethylene and is particularly suitable to the traceability of polyethylene tubes for a gas distribution network.

Other characteristics and advantages of the invention will emerge clearly from the description given hereafter on an indicative but in no way limiting basis with reference to the single FIGURE which is a schematic diagram of the running of this process.

DETAILED DESCRIPTION OF THE INVENTION

For the sake of clarity, the process of the invention will be described hereafter in its preferred application, which is that of the traceability of polyethylene products, and more precisely, the traceability of polyethylene tubes for a gas distribution network.

Although the use of polyethylene tubes in gas distribution networks is relatively recent, it is very widespread.

Even if the guarantee of suitable durability of these tubes over time appears to be an established fact, it is necessary to have methods that allow one to keep track of the conditions of the distribution network in real time and to check its change with time, in order to be able to anticipate incidents which can occur and to determine the interventions for confronting them.

Furthermore, the very wide diversity of the polyethylene resins which are used, as well as the regular change of their performance from the beginning of the 1980s, connected with quite variable conditions of implementation and of operation, do not enable one to predict a generic service life solely on the basis of the traditional hydraulic pressure tests.

Under these conditions, it is necessary to arm oneself with tools and predictive models that take into account the specificities of the different polyethylenes as well as their conditions of implementation, installation and operation which can deviate from the norm.

Since the implementation of these tools and models cannot guarantee 100% capture of the defects, particularly because of possible manufacturing deviations, it is necessary to be able to retrieve from the ground at any time any tube and accessory proven a posteriori to be defective on the basis of additional long-term laboratory tests.

Taking into account the large number of lots of material manufactured on the average in a year for a national distribution network, it is necessary that each tube have a means of identification which is both very complete and very reliable.

The invention, which can be placed in this problem scheme, is concerned more specifically with the conditions of operation that makes it possible to guarantee that each tube receive the means of identification pertaining to it, that is, that makes it possible to prevent a tube from receiving a means of identification pertaining to another tube.

For this purpose, the process of the invention provides for tracking each tube even before it is manufactured.

In a general manner, the tubes or products PROD under consideration are manufactured on a production line localized in space, during a manufacturing campaign localized in time, and from data of origin identifying even in detail the products which are intended for manufacture, and which are communicated by the purchaser of these products to their manufacturer.

Typically, these data of origin, just before the manufacturing campaign, are brought together at the manufacturer, that is, at a source point designated P_SOURCE in the FIGURES, and include at least a control identification number C, given by the purchaser or by the manufacturer, and manufacturing data D common to all products PROD which are foreseen to be manufactured in the course of the next manufacturing campaign, where the control identification number C and the manufacturing data D are indissociably assigned to this manufacturing campaign.

As shown in the FIGURE, the process of the invention provided for the formation of two parallel information flows, $\Phi_1$ and $\Phi_2$, each of which ensures a propagation of the data of origin C and D in time and space from the point source P_SOURCE.

A first of these two flows, designated $\Phi_1$, is subdivided into a manufacturing control flow designated $\Phi_{PF}$, and a manufacturing reference flow designated $\Phi_{RF}$.

The manufacturing control flow $\Phi_{PF}$ makes it possible to prepare the control of the manufacturing parameters of the production line of the products PROD in accordance with the manufacturing data D of these products, where this operation is identified by the reference PREP_PILOT in the FIGURE.

The manufacturing reference flow $\Phi_{RF}$ makes it possible to print, in the course of the step IMP_DOF, a manufacturing order document DOF which is the faithful reflection of the manufacturing parameters prepared for the next campaign, and which therefore contain at least the data of origin C and D.

The second of the two parallel information flows, designated $\Phi_2$, constitutes a labeling control flow $\Phi_{PE}$ and is intended for controlling marking of the manufactured products PROD.

According to one aspect of the invention, each of the products PROD is marked in the course of a step designated APPOS by an appended label ETIQ specific to it.

The propagation of the data of origin C and D in the labeling control flow $\Phi_{PE}$ is ensured, on the one hand, by the printing of a label reel BOBIN in the course of a step designated IMP_BOBIN, and on the other hand, by the printing of a printing report PVI for the reel in the course of a step designated IMP_PVI, where the printing of the printing report PVI is conditioned by the previous and complete printing of the label reel BOBIN.

In order to prevent the possible negative effects of imperceptible printing, the process of the invention can include an immediate verification process that is carried out continuously during the printing of the label reel BOBIN and consisting, after the printing of each label ETIQ of this reel, of re-reading this label automatically in order to verify at least that it has been printed completely and legibly.

With the data of origin C and D thus propagated in space and time, the process of the invention includes three tests that make it possible to verify the internal consistency and the integrity of these data of origin in the form in which they are propagated.

Thus, the process of the invention includes a first test, designated COMPAR_1, which makes it possible to verify the consistency between the control identification number C as it is printed on the manufacturing order document DOF and the control identification number C as it is printed on the printing report PVI of the reel.

Preferably, the control identification number C is printed on the printing report PVI both in a form which can be read directly by a human operator and for which there is no reason for any notation other than C, and in the form of an optical code K(C), for example, a conventional bar code, which can be read by a laser beam optical reader and which is linked to the control identification number C by a predetermined coding rule.

The manufacturing data D itself can be printed on the printing report PVI both in its natural form D, which can be read directly by a human operator, and in the form of an optical code K(D), such as a bar code, which can be read by an automatic optical reader of the same type as mentioned above.

In order to implement the test COMPAR_1, the process of the invention includes an operation designated REPORT_1 in which the control identification number C read on the manufacturing order document DOF is transferred, as the first element of comparison, into the memory of a first computer, and an operation designated REPORT_2 in which the control identification number optical code K(C) printed on the printing report PVI and read by an optical reader connected to this first computer is transferred into the memory of this computer as the second element of comparison.

Once the operations REPORT_1 and REPORT_2 have been executed, the first computer verifies the correspondence between the elements of comparison which have been submitted to it.

If the process for manufacturing of the products PROD is highly automated, the first computer can consist of a central processing unit with which the operation PREP_PILOT of preparation of control of the manufacturing parameters is executed, in which case the operation REPORT_1 is automatically executed by the entering of the manufacturing data on said central processing unit.

On the other hand, if the process for manufacturing of the products PROD is not very automated, the operation REPORT_1 may require a human intervention.

For example, the control identification number C may be read on the manufacturing order document DOF by a human operator who reads it in uncoded form and who enters it several times successively, for example, two consecutive times, on a keyboard connected to the first computer.

In the latter case, in order to proceed with the test COMPAR_1, the first computer must verify both the identicality of the two control identification numbers C entered by the operator, and the correspondence of these numbers with the control identification number optical code K(C) read by the optical reader on the printing report PVI, where this computer is therefore programmed in order to decode the code K(C) and to compare the result of this decoding with control identification number C.

If the test COMPAR_1 leads to a failure, that is, if the first computer detects an inconsistency, designated $\Theta$, in the elements of comparison submitted to it, it imposes an interrupt to the process, designated STOP1, in order to identify and correct the detected error.

If the test COMPAR_1 is conducted successfully, that is, if the first computer confirms the correspondence, designated $\Theta$, between the elements of comparison submitted to it, the label reel BOBIN is installed at the end of the production line, and this first computer gives an authorization, designated OK1!, to proceed with the second test COMPAR_2.

The second test COMPAR_2, which is implemented under the condition, designated OK1?, that the authorization OK1! to continue the process has been given, makes it possible to verify the consistency between the manufacturing data D propagated by the labeling control flow $\Phi_{PE}$, as it is printed on the label reel BOBIN, on the one hand, and as it is printed on the printing report PVI, on the other hand.

Preferably, the manufacturing data D is printed, on the printing report PVI and on the label reel BOBIN, both in a form which can be read directly by a human operator, and in the form of respective optical codes K(D), such as bar codes, which can be read automatically by a laser beam optical reader, as in the case of the control identification number printed on the printing report.

In order to implement the test COMPAR_2, the process of the invention includes an operation designated REPORT_3 in which the optical code K(D) of the manufacturing data read on the printing report PVI by a second optical reader connected to a second computer is transferred, as the third element of comparison, into the memory of this second computer, and an operation designated REPORT_4 in which the optical code K(D) of the manufacturing data read on the label reel BOBIN by this second optical reader is transferred, as the fourth element of comparison, into the memory of this same computer.

The second computer, for example, consists of a shop floor terminal, directly installed at the output of the production line, and, in the case in which the process is highly automated, connected to the first computer mentioned in the preceding.

Once the operations REPORT_3 and REPORT_4 have been executed, the second computer verifies the correspondence between the elements of comparison submitted to it.

If the test COMPAR_2 leads to a failure, that is, if the second computer detects an inconsistency, designated $\Theta$, in the elements of comparison submitted to it, it imposes an interrupt to the process, designated STOP2, in order to identify and correct the detected error.

If the test COMPAR_2 is conducted successfully, that is, if the second computer confirms the correspondence, designated $\equiv$, between the elements of comparison submitted to it, this second computer gives an authorization, designated OK2!, to proceed with the appending APPOS of the labels ETIQ, one by one, on the products PROD, and to proceed with the third test COMPAR_3.

In fact, since it is very advantageous to append the labels to the products PROD as the products are manufactured, the authorization OK2! given by the second computer is preferably designed at the same time to be an authorization to manufacture the products, to label them one by one as they are output from the production line and in the process of their manufacture, and simultaneously to proceed with the third test COMPAR_3.

Thus, when the condition, designated OK2?, for appearance of the authorization OK2!, is realized, the operation designated FABR for manufacturing the products PROD is launched, as is the operation, designated APPOS, for appending the labels ETIQ to these products.

In order to be able to identify each of the manufactured products individually, it is advantageous if each label ETIQ, in addition to the optical code K(D) of manufacturing data common to all the products manufactured in the same campaign, carries an optical code K(N) which is linked by the predetermined coding rule to a serial number N specifically assigned to the product PROD which is intended to receive this label ETIQ.

The third test COMPAR_3, which is launched at the same time as the label appending, operation APPOS, makes it possible to verify the consistency between the manufacturing data D as printed, in the form of an optical code K(D), on the printing report PVI, and as printed on the labels ETIQ appended to the manufactured products PROD.

In order to implement the test COMPAR_3, the process of the invention includes an operation designated REPORT_5, in which the manufacturing data D and the serial number N, read by a third optical reader connected to a third computer and in the from of respective optical codes K(D) and K(N) of manufacturing data and of the serial number respectively, printed on each label ETIQ, are transferred into the memory of this third computer, as the fifth element of comparison.

Furthermore, the manufacturing data D read in the form of the manufacturing data optical code K(D) printed on the printing report PVI is transferred into the memory of this third computer, as the sixth element of comparison.

In fact, the third computer can consist of the second computer and, for example, can be formed by the same shop floor terminal, in which case the sixth element of comparison can quite simply consist of the third element of comparison, as stored in memory in this shop floor terminal, by an operation designated MEM, on the occasion of the second test COMPAR_2.

Once it has available the fifth and sixth elements of comparison, respectively, K(D)+K(N) and K(D), the third computer verifies that the sixth element of comparison K(D) is indeed contained in the fifth element of comparison, K(D)+K(N).

If the test COMPAR_3 leads to failure, that is, if this third computer does not find the sixth element of comparison K(D) in the fifth element of comparison K(D)+K(N), where this situation is designated $\Theta$, it imposes an interrupt to the labeling operation, designated STOP3, in order to identify and correct the detected error.

If the test COMPAR_3 is completed successfully, that is, if the third computer confirms the presence, designated $\equiv$, of the sixth element of comparison K(D) in the fifth element of comparison K(D)+K(N), said third computer executes the printing, designated IMP_PVF, of a final manufacturing and labeling report designated PVF.

The invention claimed is:

1. An identification process that makes it possible to confer traceability to products manufactured on a production line, in the course of a manufacturing campaign, from data of origin initially brought together at a source point that includes a control identification number and manufacturing data common to the products manufactured during this campaign, the identification process including the steps of:
    installing two parallel flows of information, each of which ensures propagation of the data of origin in time and space from the source point, a first of said flows being subdivided into a manufacturing control flow intended for controlling the manufacture of the products according to the manufacturing data, and into a manufacturing reference flow, and the second flow forming a labeling control flow intended for controlling an operation for marking of the manufactured products by an operation of appending of labels to these products,
    ensuring the propagation of the data of origin in the manufacturing reference flow of the first flow by printing a manufacturing order document,
    ensuring the propagation of the data of origin in the second flow by printing a label reel and by subsequently printing a printing report for the label reel,
    verifying, as a first test, the consistency between a control identification number printed on the manufacturing order document and a control identification number printed on the printing report for the label reel,
    verifying, as a second test, the consistency between manufacturing data printed on the label reel and manufacturing data printed on the printing report,
    verifying, as a third test, the consistency between the manufacturing data printed on the printing report and manufacturing data printed on the labels appended to the manufactured products, and
    printing a final manufacturing and labeling report if the third test is conducted successfully.

2. The identification process according to claim 1, wherein ensuring the propagation of the data of origin in the second flow includes printing the control identification number on the printing report at least in the form of a control identification number optical code readable by an optical reader and linked to the control identification number by a predetermined coding rule.

3. The identification process according to claim 2, wherein the first test includes:
    transferring into the memory of a first computer, as a first element of comparison, the control identification number read on the manufacturing order document,
    transferring into the memory of this first computer, as a second element of comparison, the control identification number read, by a first optical reader connected to the first computer, in the form of the control identification number optical code printed on the printing report, and
    submitting to the first computer the task of verifying the correspondence between the first and second elements of comparison.

4. The identification process according to claim 3, further including:
    reading the control identification number on the manufacturing order document by a human operator who reads it in uncoded form, and
    entering, by the human operator, the control identification number several times successively on a keyboard connected to the first computer, wherein the first test further includes
    verifying, by the first computer, the identicality of the control identification numbers entered by the operator and the second element of comparison, this second element of comparison being obtained by decoding, by the predetermined coding rule, of the control identification number optical code read by the first optical reader.

5. The identification process according to claim 1, further including, when the first test is conducted successfully,
    installing the label reel on the production line, and giving an authorization to proceed with the second test.

6. The identification process according to claim 2, further including printing the manufacturing data on the printing report and on the label reel, at least in the form of respective manufacturing data optical codes which can be read by an optical reader and which are linked to the respective control identification numbers by the predetermined coding rule.

7. The identification process according to claim 6, wherein the second test includes:
- transferring into the memory of a second computer, as a third element of comparison, the manufacturing data read by a second optical reader connected to the second computer in the form of the manufacturing data optical code printed on the printing report,
- transferring into the memory of the second computer, as a fourth element of comparison, the manufacturing data read by the second optical reader connected to the second computer in the form of the manufacturing data optical code printed on the label reel, and
- giving the second computer the task of verifying the correspondence between the third and fourth elements of comparison.

8. The identification process according to claim 1, further including, when the second test is conducted successfully,
- giving an authorization to label the manufactured products one by one and to proceed with the third test.

9. The identification process according to claim 1, further including, when the second test is conducted successfully,
- giving an authorization to manufacture the products, to label them one by one as they are output from of the production line and in the process of their manufacture, and simultaneously to proceed with the third test.

10. The identification process according to claim 1, further including, after the printing of each label of the label reel,
- re-reading this label automatically in order to verify at least that it has been printed completely.

11. The identification process according to claim 6, further including printing on each label of the label reel an optical code linked by the predetermined coding rule to a serial number specifically assigned to the product which is intended to receive this label.

12. The identification process according to claim 11, wherein the third test includes:
- transferring into the memory of a third computer, as a fifth element of comparison, the manufacturing data and the serial number read by a third optical reader connected to the third computer in the form of the manufacturing data and serial number optical codes respectively, a printed on each label,
- transferring into a memory of the third computer, as a sixth element of comparison, the manufacturing data read in the form of the manufacturing data optical code printed on the printing report, and
- giving the third computer the task of verifying that the sixth element of comparison is contained in the fifth element of comparison.

13. The identification process according to claim 7, wherein the second and third computers are comprised in the same unit in the form of a shop floor terminal, and the sixth element of comparison includes the third element of comparison stored in a memory in this shop floor terminal on the occasion of the second test.

14. The identification process according to claim 1, wherein the identification process is applied to the traceability of products made of polyethylene.

15. The identification process according to claim 1, wherein the identification process is applied to the traceability of polyethylene tubes used in a gas distribution network.

16. The identification process according to claim 12, wherein the second and third computers are comprised in the same unit in the form of a shop floor terminal, and the sixth element of comparison includes the third element of comparison stored in a memory in this shop floor terminal on the occasion of the second test.

* * * * *